Figure 1:
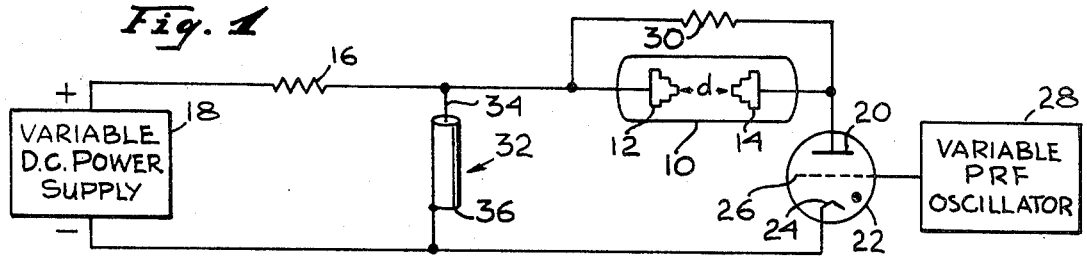

United States Patent

[11] 3,560,795

[72] Inventors Slava A. Pollack
350 Palos Verdes Blvd, Redondo Beach, Calif. 90277;
Richard C. Mackey, 6228 Belmar Ave., Reseda, Calif. 91335
[21] Appl. No. 864,272
[22] Filed Sept. 29, 1969
[45] Patented Feb. 2, 1971
Continuation of application Ser. No. 505,500, Oct. 28, 1965, now abandoned.

[54] HIGH INTENSITY SHORT DURATION HIGH REPETITION RATE LIGHT SOURCE
15 Claims, 5 Drawing Figs.
[52] U.S. Cl. .................................................. 315/240,
315/241, 313/183, 313/185, 313/199, 313/200,
313/223, 313/224, 313/225, 313/226, 313/227,
313/228, 313/229
[51] Int. Cl. .................................................. H05b 37/00
[50] Field of Search .................................................. 313/183,
185, 186, 188, 199, 200, 220, 221, 223, 224, 225,
226, 227, 228, 229; 315/240, 241

[56] References Cited
UNITED STATES PATENTS
3,078,418  2/1963  Theodore ............ 315/340X
3,088,074  4/1963  Ross .................. 315/340X Primary Examiner—John W. Huckert
Assistant Examiner—R. F. Polissack
Attorney—Daniel T. Anderson, Gerald I. Singer and Alfons Valukonis ABSTRACT: A light source having a lamp envelope with electrodes positioned therein a predetermined distance apart. A gaseous medium is provided within the envelope which has a predetermined pressure for providing a minimum duration maximum intensity output light pulse characteristic of the gaseous medium when a voltage pulse of comparable duration is applied across the electrodes to ionize the gaseous medium. The voltage pulse is provided by a pulse-forming circuit which is adapted to be changed to a predetermined voltage from a source of electrical energy to generate the voltage pulse having a time duration comparable to the duration of the output light pulse. A circuit is also provided for periodically connecting the pulse-forming circuit to the electrodes to discharge the voltage pulse through the gaseous medium.

INVENTORS
SLAVA A. POLLACK
RICHARD C. MACKEY

HIGH INTENSITY SHORT DURATION HIGH REPETITION RATE LIGHT SOURCE

This application is a continuation of earlier filed copending application for U.S. Letters Pat. Ser. No. 505,500, filed Oct. 28, 1965, now abandoned.

This invention relates to gas glow lamp sources and more particularly relates to a high intensity, short duration, high repetition rate gas glow lamp.

There are many applications requiring devices capable of producing intense light pulses of very short time durations at high repetition rates. Some of these applications involve photography of fast events such as those occurring in a shock wave tube, testing and calibration of scintillation counters, investigations involving afterpulsing, determination of transit times, and statistics in photomultiplier tubes and measurement of the fluorescence lifetimes of solids, liquids and gases.

Heretofore existing light sources such as flash tubes, mechanically or electronically interrupted discharge lamps, spark gaps, mercury relays, PN junctions pulsed by reversed currents and Kerr cell controlled sources had numerous disadvantages. The flash tubes and discharge lamps are mainly useful in the microsecond to millisecond flash time duration region, the flash duration of the flash tubes being limited by the time constant of the associated circuit and that of the electronically interrupted discharge lamps by the afterglow tail of the plasma. In addition, flash tubes are only capable of low repetition rates. Also the spectral compositions of these sources' light outputs vary, depending on the particular gases and voltages used, but generally the emissions produced are very poor in the ultraviolet radiation region.

Some of the spark gap, mercury relay, and PN junction devices are capable of emitting light pulses having time durations in the nanosecond region, but unfortunately the intensities of light pulses so produced are usually very low making the devices in some instances barely suitable for the desired application. The light emitted by PN junction devices is mainly in the visible region of the spectrum. There is great structural variation in spark gap and mercury relay devices, but most of them exhibit undesirable secondary pulses after the main light pulse is generated and particularly occur at higher repetition rates.

Pulsed sources requiring a Kerr cell for operation are usually space consuming and the repetition rate is severely limited by power supply capabilities.

Briefly, in accordance with this invention there is provided a light source capable of generating intense short duration, high intensity constant shape light pulses in predetermined regions of the spectrum with very high repetition rates. Light pulse durations on the order of magnitude of the lifetime of an excited state of an atom can be obtained. In several embodiments of the invention a transparent envelope containing a mixture of gaseous substances having predetermined individual partial pressures is caused to emit sharp light pulses during the electrical breakdown of the gaseous materials after predetermined periodic electrical voltage is applied to the electrodes of the lamp by a novel voltage applying circuit. In several other embodiments of the invention instead of a mixture of gases there are employed individual gases at predetermined pressures for producing the desired spectral emissions.

Accordingly, it is an object of this invention to overcome the foregoing disadvantage of prior devices and provide high intensity, short duration, high repetition rate gas glow discharge lamp apparatus.

Another object of the present invention is the provision of gas glow discharge lamp apparatus incorporating novel voltage-applying circuit means capable of applying voltage to a lamp containing predetermined gaseous material to generate high intensity, short duration light pulses of predetermined spectral composition.

One other object of the present invention is the provision of novel gas glow discharge lamp apparatus capable of generating high intensity, short duration, high repetition rate light pulses characteristic of the atomic spectrum of mercury.

Still another object of this invention is the provision of novel gas glow discharge lamp apparatus capable of generating high intensity, short duration, high repetition rate light pulses characteristic of hydrogen.

One object of this invention is the provision of novel gas glow discharge apparatus capable of generating high intensity, short duration, high repetition rate light pulses characteristic of the atomic spectrum of nitrogen.

An object of the present invention is to provide gas glow discharge apparatus capable of generating high intensity, short duration, high repetition rate light pulses characteristic of the atomic spectrum of deuterium.

Figure 2:
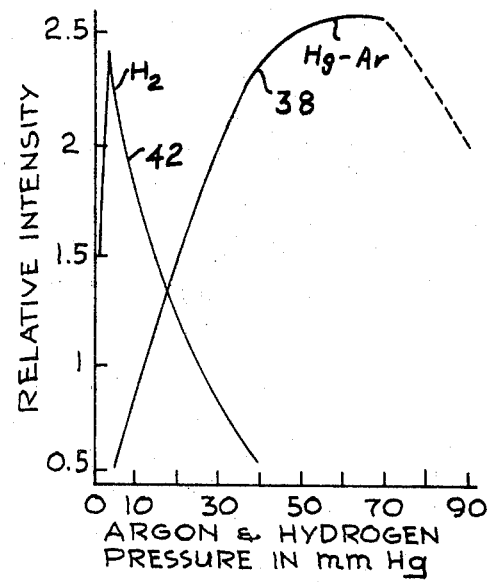
Figure 3:
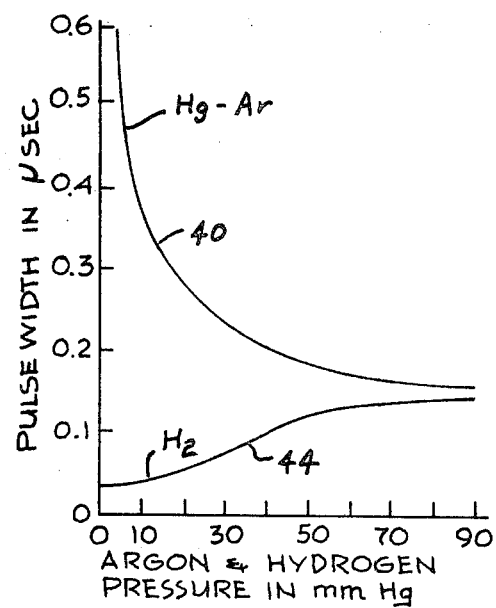
Figure 4:
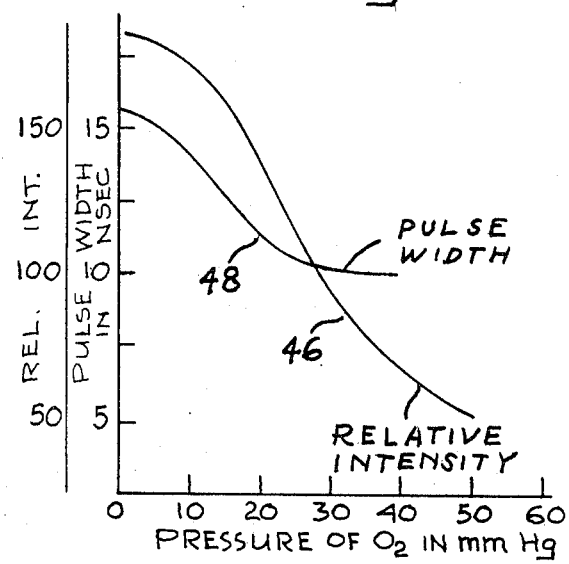
Figure 5:
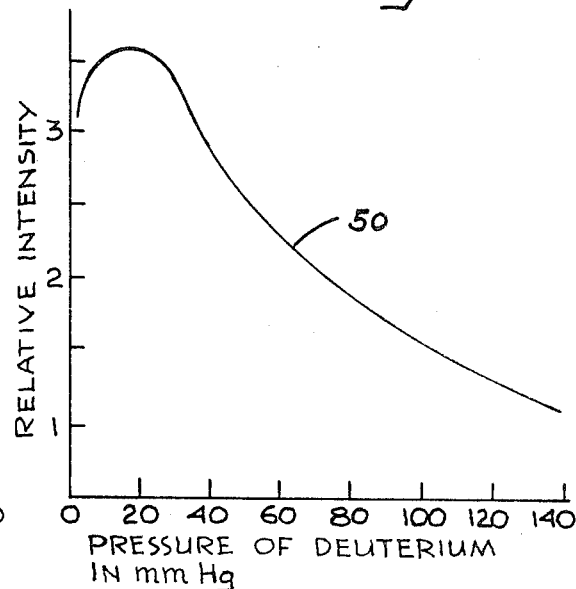

These and other objects and features of the invention may be more fully appreciated upon consideration of the following drawing and specification wherein:

FIG. 1 is a part schematic and part block diagram circuit showing of the invention;

FIG. 2 shows a pair of curves, one curve setting forth the relative intensity of a light pulse emitted from a lamp of the apparatus of FIG. 1 of the present invention having a mixture of mercury and argon as a function of the partial pressure of the argon, the mercury being maintained at a constant pressure; the other curve sets forth the relative intensity of a light pulse emitted wherein the lamp of the invention contains hydrogen versus the pressure of the hydrogen in the lamp;

FIG. 3 shows another pair of curves, one curve setting forth the width of a light pulse emitted from the lamp of the apparatus of FIG. 1 having a mixture of mercury and argon as a function of the partial pressure of the argon, the mercury partial pressure being maintained at a constant value; the other curve sets forth the pulse width of the pulse emitted wherein the lamp contains hydrogen versus the pressure of the hydrogen in the lamp;

FIG. 4 shows still another pair of curves, one curve setting forth the relative intensity of a light pulse emitted from a lamp of the apparatus of FIG. 1 having a mixture of nitrogen and oxygen as a function of the partial pressure of the oxygen, the partial pressure of the nitrogen being varied over a predetermined range; the other curve sets forth the pulse width of the pulse emitted wherein the lamp contains nitrogen and oxygen varied over the above predetermined pressures; and FIG. 5 shows another curve setting forth the relative intensity of a light pulse of predetermined duration emitted from the lamp of FIG. 1 having deuterium therein as a function of the pressure of the deuterium.

Referring to FIG. 1, the numeral 10 designates a lamp envelope which is shown as being cylindrical but could be any desired shape for containing gaseous material to be hereinafter more specifically described. The envelope 10 is preferably fashioned from quartz or other suitable transparent substance and is adapted to contain a pair of metallic electrodes 12 and 14, preferably of so-called well-known "beehive" geometrical configuration, and fashioned from thoriated tungsten or the like. The electrodes 12 and 14 are adapted to be spaced within the envelope 10 a predetermined gap distance "d," as will hereinafter be more fully described.

The electrode 12 is connected through an isolation resistor 16 to the positive terminal of a variable DC power supply 18. The power supply 18 can be any DC power supply capable of being varied to provide in its output voltages varying from 0 to 10,000 volts.

The electrode 14 is connected to the plate 20 of a thyratron tube 22 that has its cathode 24 connected to the negative terminal of the power supply 18. The grid 26 of the tube 22 is connected to a variable pulse repetition frequency oscillator 28. The thyratron tube 22 is nonconductive, but becomes conductive with the application of a trigger pulse to its grid 26 to serve as an "on" and "off" switch.

The pulse repetition frequency oscillator 28 can be of any type as long as it is capable of generating trigger pulses whose time durations and repetition rates can be regulated as desired. For example, it has been found desirable to employ an oscillator 28 which can generate trigger pulses having time durations 1 to 10 μsec. and repetition rates from 50 to 5,000 cycles per second.

A resistor 30 is connected across the electrodes 12 and 14 of the lamp 10 for a purpose to be hereinafter more fully described.

A pulse-forming circuit 32 in the form of a coaxial cable has its center connector 34 connected to the electrode 12 and its outer connector 36 connected to the negative terminal of the power supply 18. In the practice of this invention it has been found that an RG 55 cable having a length of 18 inches can be used as the pulse-forming circuit 32.

Operation of the apparatus of FIG. 1 is as follows:

DC power supply 18 charges the pulse-forming circuit 32 through the isolation resistor 16. When fully charged, the voltage between leads 34 and 36 of the pulse-forming circuit 32 equals the output voltage of the power supply 18 and no current flows through resistor 16. Current does not flow through the branch containing discharge lamp 10 and switch tube 22 as the switch tube 22 behaves as though it were an open circuit before it is triggered. As the discharge lamp 10 also behaves like an open circuit before it is ionized, resistor 30 insures that the full voltage of the charged pulse-forming circuit 32 is applied across the switch tube 22 before it is triggered. When a positive voltage pulse of predetermined amplitude is applied to the control electrode grid 26, the trigger tube becomes ionized causing a low impedance path to exist between cathode 24 and anode 20. This results in essentially all of the potential of the charged pulse-forming network being switched substantially instantaneously from the switch tube to the discharge lamp. The magnitude of the potential applied is such as to exceed the breakdown potential of the gaseous medium in the lamp 10 and a low impedance ionized path is caused to exist between the lamp electrodes 12 and 14. The path now being completed allows a current to flow from the pulse-forming circuit 32 through the lamp 10 and switch tube 22 with the result that the pulse-forming circuit 32 is discharged. The time of discharge of the pulse-forming circuit 32 is chosen to be comparable to the natural discharge time of the lamp 10. When the energy stored in the pulse-forming circuit is completely dissipated, both lamp 10 and switch tube 22 become deionized and again assume the high impedance characteristics of an open circuit. The impedance of isolating element 16 is of such predetermined value so that deionization of the gaseous medium in the lamp will take place. Once deionization occurs the pulse-forming circuit begins to charge through element 16 and the cycle is repeated. The frequency of repetition of light pulse generation is determined by the frequency or the trigger pulses applied to the control electrode 26 of the switch tube 22 by the generator 28. Trigger pulses of 50—200 volts amplitude and rise times less than 100 nanoseconds are suitable. The widths of the trigger pulses are not critical, although they must be held to a small enough value to permit deionization of the switch tube 22.

It will be appreciated that light pulse intensity and duration depend on such parameters as the voltage applied across the electrodes 12 and 14, the gas pressure within the envelope 10 and the separation "d" of the electrodes 12 and 14.

FIGS. 2 and 3, curves 38 and 40, respectively, illustrate one example of an embodiment of this invention wherein there is utilized a mercury-argon mixture in the envelope 10, a 0.5—0.28 μsec. pulse as measured between half-intensity points can be generated with the following values of the various parameters: voltage pulse across the electrodes 12 and 14 equal to 3,000 volts; the gap "d" between the electrodes 12 and 14 being 3.5 cm.; the mercury partial pressure being equal to $10^{-2}$ mm. Hg.; and the argon partial pressure between 50 —70 mm. Hg. In another example, not illustrated wherein the mercury-argon mixture is utilized in the envelope 10, a 50 to 60 nanosecond pulse as measured between half-intensity points can be generated with the following values of the various parameters: voltage pulses across the electrodes 12 and 14 equal to 5,000 volts; the gap between the electrodes 12 and 14 being 2 cm.; the mercury partial pressure being equal to $10^{-2}$ mm. Hg.; and the argon partial pressure being 50 —70 mm. Hg. The total peak power emitted by the lamp envelope in the violet-green region (3,000—5,000A°) of the spectrum is about 5 to 10 watts in this example.

In still another embodiment, FIGS. 2 and 3, curves 42 and 44, respectively, wherein the gas used in the envelope is hydrogen; the gap between the electrodes 12 and 14 is 2 cm.; the applied voltage pulse is 3,000 volts; and the pressure of hydrogen is predetermined at less than 1 mm. Hg.; the light pulse width for maximum intensity is less than 20 nanoseconds.

Referring to FIG. 4, the curve 46 sets forth the relative intensity of a light pulse produced from a mixture of nitrogen and oxygen as a function of the oxygen partial pressure. In the same FIG. 4, there is also shown a curve 48 relating the pulse width of the pulse produced from the same mixture of nitrogen and oxygen as a function of the partial pressure of the oxygen in the envelope. A pulse of desirable minimum width and maximum intensity is one wherein the partial pressure of the nitrogen is 70 to 90 mm. Hg. and the partial pressure of oxygen is 15 to 25 mm. Hg. in the envelope. In this instance, the electrode gap is 1 cm. and the applied voltage pulse is 9,000 volts. The light pulse width is between 10 to 12 nanoseconds with a total peak power of 75 —100 watts.

Still another embodiment of the invention is one where deuterium gas can be utilized to produce a pulse having a width of substantially 10 nanoseconds at the maximum desired intensity. In this instance the deuterium in the envelope is supplied at a pressure between 10 and 30 mm. Hg. The curve 50 of FIG. 5 sets forth the relative intensity of the emanating pulse as a function of the pressure of the deuterium gas. In this embodiment, the electrode gap is 1 cm. and the applied voltage is 9,000 volts. Total peak power is about 5 watts.

Although specific embodiments of the present invention have been described and illustrated in detail, it is to be clearly understood that the same are by way of illustration and example only; it is to be understood that the invention is not limited thereto, as many variations will be readily apparent to those versed in the art and the invention is to be given its broadest possible interpretation within the terms of the appended claims.

We claim:

1. A source of light pulses comprising:
   a gas discharge lamp having electrodes therein; and
   a gaseous atmosphere in said lamp selected from the group consisting of (1) a mixture of mercury vapor at a partial pressure of $10^{-2}$ mm., of mercury and argon at a partial pressure between 50 and 70 mm., of mercury, (2) a mixture of nitrogen at a partial pressure between 70 and 90 mm., of mercury and oxygen at a partial pressure between 15 and 25 mm., of mercury, (3) hydrogen at a pressure less than 1 mm., of mercury and (4) deuterium at a pressure between 10 and 30 mm., of mercury.

2. A source according to claim 1 wherein said gaseous atmosphere is the mercury vapor and argon.

3. A source according to claim 1 wherein said gaseous atmosphere is the nitrogen and oxygen.

4. A source according to claim 1 wherein said gaseous atmosphere is the hydrogen.

5. A source according to claim 1 wherein said gaseous atmosphere is the deuterium.

6. A source according to claim 1 further comprising: an electric pulse generator coupled to said electrodes for generating a voltage pulse to cause a discharge in said lamp.

7. A source according to claim 6 wherein said gaseous atmosphere is the mercury and argon.

8. A source according to claim 6 wherein said gaseous atmosphere is the nitrogen and oxygen.

9. A source according to claim 6 wherein said gaseous atmosphere is the hydrogen.

10. A source according to claim 6 wherein said gaseous atmosphere is the deuterium.

11. A source according to claim 6 wherein said pulse generator comprises:

a pulse-forming circuit capable of being charged to a predetermined voltage from a supply of electrical energy for generating said voltage pulse; and means for periodically connecting said pulse forming circuit to the electrodes of said lamp to discharge said voltage pulse through said gaseous atmosphere in said lamp.

12. A source according to claim 11 further comprising means for maintaining said predetermined voltage across said periodically connecting means until said pulse-forming means is connected to said electrodes.

13. A source according to claim 11 wherein said pulse-forming circuit includes a length of coaxial cable providing a storage capacitor to be charged from said supply.

14. A source according to claim 11 wherein said periodically connecting means comprises normally open switch means, and means for generating a triggering signal to periodically close said switch means.

15. A source according to claim 14 wherein said switch means comprises a thyratron circuit means connected to said trigger generating means and adapted to be actuated by said triggering signal.